(12) United States Patent
Daly et al.

(10) Patent No.: US 7,367,173 B2
(45) Date of Patent: May 6, 2008

(54) GREENS MOWER DATA DISPLAY AND CONTROLLER

(75) Inventors: Shawn Daly, Wildwood, MO (US); Carlos Bellot, Charlotte, NC (US)

(73) Assignee: Textron Inc., Providence, RI (US)

( * ) Notice: Subject to any disclaimer, the term of this patent is extended or adjusted under 35 U.S.C. 154(b) by 181 days.

(21) Appl. No.: 11/071,049

(22) Filed: Mar. 2, 2005

(65) Prior Publication Data

US 2006/0196159 A1    Sep. 7, 2006

(51) Int. Cl.
*A01D 41/14*    (2006.01)
*A01D 41/127*   (2006.01)
*A01D 46/08*    (2006.01)

(52) U.S. Cl. .................................... 56/10.2 R

(58) Field of Classification Search ............ 56/7, 56/10.2 R, 14.4, 156, 198, 220, 231, 249, 56/294, DIG. 20
See application file for complete search history.

(56) References Cited

U.S. PATENT DOCUMENTS

| | | | |
|---|---|---|---|
| 5,394,678 A | | 3/1995 | Lonn et al. |
| 5,406,778 A | * | 4/1995 | Lamb et al. ........... 56/7 |
| 5,497,604 A | * | 3/1996 | Lonn ............ 56/10.2 H |
| 6,339,916 B1 | * | 1/2002 | Benson .......... 56/10.2 R |
| 6,622,464 B2 | * | 9/2003 | Goman et al. ........ 56/16.9 |
| 7,111,443 B2 | * | 9/2006 | Anderson et al. ...... 56/10.8 |
| 2003/0061792 A1 | | 4/2003 | Fillman et al. |
| 2004/0163373 A1 | | 8/2004 | Adams et al. |

FOREIGN PATENT DOCUMENTS

| EP | 1 452 084 A2 | 9/2004 |
|---|---|---|
| EP | 1 495 661 A1 | 1/2005 |

* cited by examiner

*Primary Examiner*—Arpad F Kovacs
(74) *Attorney, Agent, or Firm*—Harness, Dickey & Pierce, P.L.C.

(57) ABSTRACT

A method of controlling a greens mower, wherein the greens mower includes a motor drive system variably driving a grass cutting reel and a traction system. The method includes sensing an operating parameter, comparing the operating parameter to a predetermine parameter and outputting a control signal to the motor drive system in response thereto, and further outputting a user signal to a display member representative of the control signal to alert an operator of the operating parameter. The method may also be used to control a fleet of greens mowers using a master controller. In this regard, the master controller may include an administrator or supervisor function preventing an operator from changing any predetermined parameter.

15 Claims, 2 Drawing Sheets

GREENS MOWER DATA DISPLAY AND CONTROLLER

FIELD OF THE INVENTION

The present invention relates to greens mowers and, more particularly, relates to a greens mower data display and control system for improved cutting performance and operation.

BACKGROUND OF THE INVENTION

As is known in the prior art, greens mowers are particularly useful in mowing golf course greens, which are known to require exacting mowing results to assure that the grass is cut consistently throughout the green. Traditionally, these greens mowers are either walk-behind type mowers or riding mowers.

Greens mowers generally employ a reel type mowing unit as opposed to a rotary type mowing unit. The clip rate of these reel type mowing units are of utmost concern due to the fact that the clip rate often determines the consistency and quality of the cut, which leads to improved turf health. Because of the time required to grow a mature green and the cost associated with therewith, it is extremely important that greens mowers operate properly and not damage the turf.

The term clip rate is generally understood to mean the ratio between the rotational speed of the reel and the corresponding speed of the traction or drive unit. The clip rate can often be measured by the distance between the locations of individual sequential grass cuts produced by the rotating reel blades successively moving over the grass. The grass between the locations of the cuts will necessarily be left taller than the cut grass at the cut locations. Consequently, the cut rate is vital to producing an optimum condition of the grass on the golf course green.

In light of this need for optimum cutting performance, it is desirable that greens mowers include electrical circuitry which precludes mower overloads and consequent mower damage, gives the operator current information on the quantity of the battery charge, automatically and manually shuts off under both desirable and undesirable conditions, automatically shuts off the electric power by a predetermined time after the mower has been used for mowing.

Additionally, it should be recognized that many golf courses are serviced by a fleet of mowers. Ideally, these mowers will provide identical cutting results in their respective mowing roles. However, as can be appreciated for instance in greens mowers, one operator may operate his mowers at a different groundspeed or clip rate than others, thereby resulting in differing cutting results.

SUMMARY OF THE INVENTION

According to the principles of the present invention, a method of controlling a walk-behind greens mower is provided. The greens mower includes a motor drive system variably driving a grass cutting reel and a traction system. The method includes sensing an operating parameter, comparing the operating parameter to a predetermine parameter and outputting a control signal to the motor drive system in response thereto, and further outputting a user signal to a display member representative of the control signal to alert an operator of the operating parameter. The method may also be used to control a fleet of greens mowers using a master controller. In this regard, the master controller may include an administrator or supervisor function preventing an operator from changing any predetermined parameter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
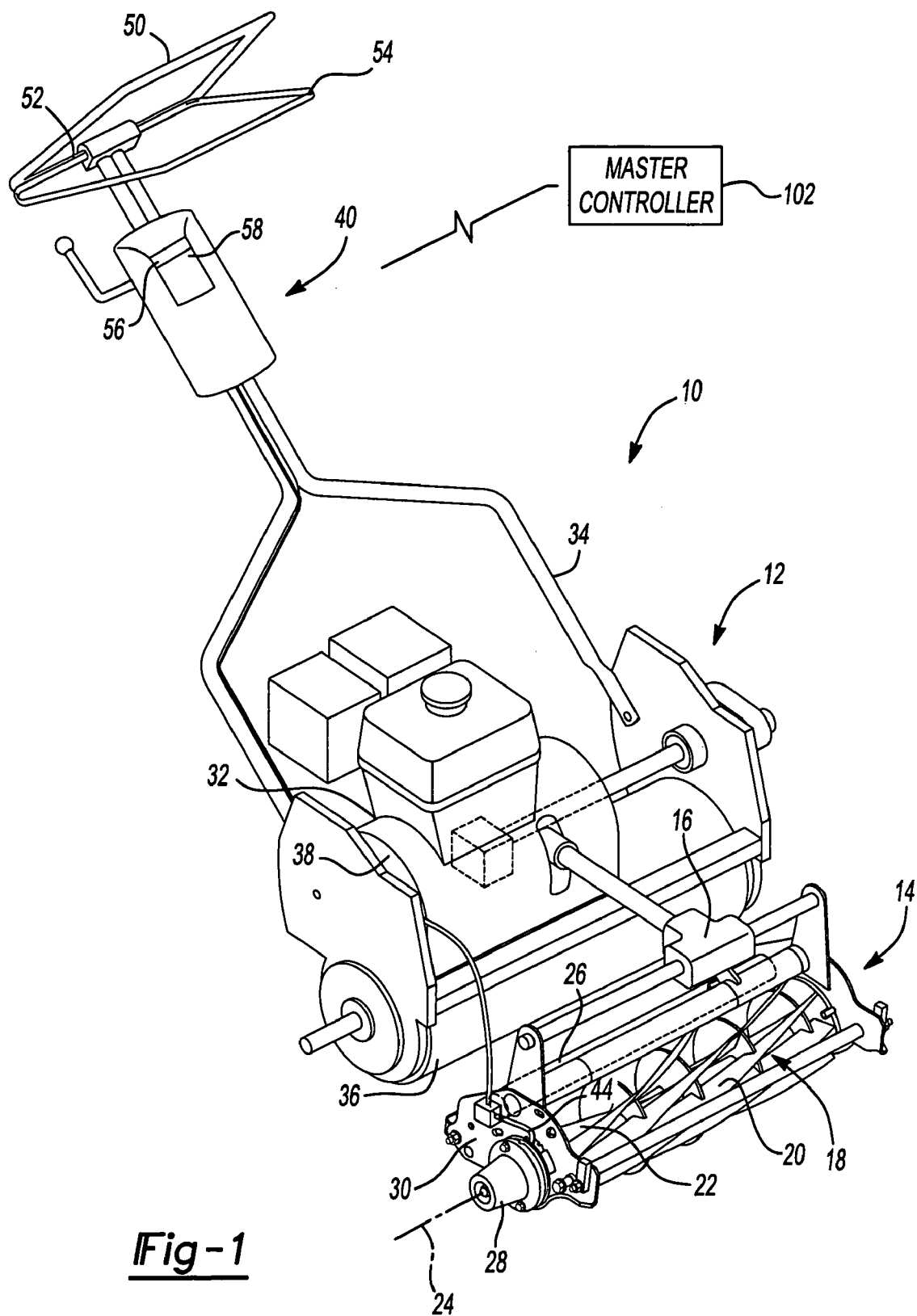
FIG. 1 is a perspective view illustrating a greens mower according to the principles of the present invention.

With reference to the figure, FIG. 1 illustrates a greens mower 10 incorporating the principles of the present invention. Greens mower 10 is a reel-type mower having a base portion 12 and a mowing unit 14. Mowing unit 14 is may be articulately coupled to base portion 12 through a pivoting mechanism 16.

Mowing unit 14 includes a rotatable greens mower reel 18 having spiraled blades 20 equally spaced around a reel shaft 22. Reel shaft 22 is generally elongated and defines a rotation axis 24 extending along the length of reel shaft 22. A conventional fixed bed knife (not shown) is operably mounted to mowing unit 14. Blades 20 orbit relative to shaft 22 and move past the fixed bed knife for the usual and well-known function of cutting the grass. Mowing unit 14 further includes a pair of ground engaging rollers 26 rotatably mounted along a forward and rearward portion of mowing unit 14. The pair of ground engaging rollers 26 serve to support mowing unit 14 for movement on the ground. The pair of ground engaging rollers 26 are preferably adjustable to define a cutting height.

Mowing unit 14 further includes a variable electric motor 28. Electric motor 28 is illustrated mounted to a side member 30 of mowing unit 14. Electric motor 28 is then operably coupled to reel 18 to rotatably drive reel 18 through a transmission system (not shown). The transmission system may include belts, gears, chains, or the like in a conventional fashion to transfer the drive force from electric motor 28 to reel 18. As should be appreciated, however, the transmission system extending between electric motor 28 and reel 18 is simple in construction, because it is directly mounted to mowing unit 14. Therefore, any articulation of mowing unit 14 does not affect the relative positional relationship of the drive motor and the reel, as is common in prior art articulating greens mowers. Consequently, the transmission system need only include the necessary pieces to define a range of rotational speeds relative to the capacity of electric motor 28, such as a simple gear train.

Base portion 12 generally includes a motor 32, a frame 34, a lawn roller 36, a drive system 38, and a handle assembly 40. Handle assembly 40 includes a handle 50 suitably connected with frame 34. Handle 50 includes a grip portion 52 which the operator can hold in steering greens mower 10. A movably mounted bail or operator hand control 54 is pivotally connected to handle 50 and is movable toward and away from the grip portion 52. The operation of hand control 54 may be similar to that disclosed in commonly owned U.S. Pat. No. 6,523,334, which is incorporated herein by reference. In this arrangement, the operator can hold both handle 50 and hand control 54 while guiding greens mower 10. Upon release of hand control 54, traction drive system 38 is interrupted in a manner similar to that disclosed in the '334 Patent.

Additionally, the vicinity of handle 50 further includes a data display 56 mounted thereon, which are therefore presented to the user for observation or actuation. A mower controller 58 is mounted on handle assembly 40.

Mower controller 58 is preferably a central processing unit capable of monitoring and controlling the various functions of greens mower 10. Mower controller 58 is preferably operably coupled to data display 56 such that data display 56 provides a simple and intuitive user interface. Referring now to the schematic representation in FIG. 2, a control system 100 is shown having mower controller 58 and data display 56. As can be seen, data display 56 is operable to communicate with mower controller 58. Data display 56 is an LCD or LED device that serves as a user interface to provide the user with critical and informative data and further to provide a simple method of managing such data and controlling greens mower 10. To this end, data display 56 may be configured for display using multinational languages and units of measure.

Figure 2:
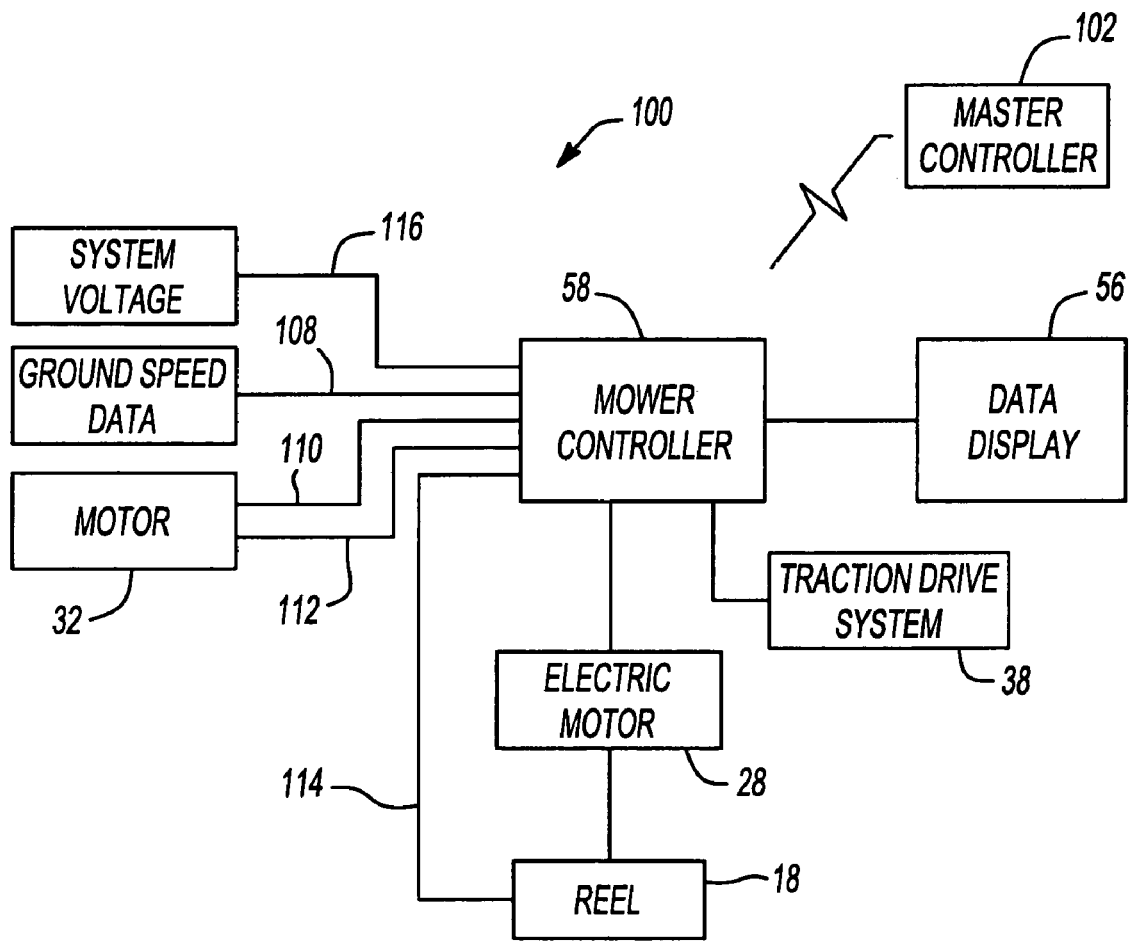
FIG. 2 is a schematic view illustrating the control system of the present invention.

With continued reference to FIG. 2, it can be seen that mower controller 58 serves as the primary processing unit and, thus, receives multiple inputs to in turn positively and actively control multiple outputs. Mower controller 58 is operable to control traction drive system 38 via a line 104. Additionally, mower controller 58 is operable to control electric motor 28 via a line 106. As described above, electric motor 28 directly controls the drive speed of reel 18. Thus, mower controller 58 is capable of controlling the speed of reel 18 (via electric motor 28) and the groundspeed of greens mower 10 (via traction drive system 38). Consequently, mower controller 58 can maintain a preselected cliprate, even if groundspeed or reel speed vary. That is, when the ground speed of greens mower 10 is reduced, mower controller 58 can reduce the speed of reel 18 and vice versa, thereby maintaining a desired clip rate.

Mower controller 58 further receives multiple inputs. For instance, mower controller 58 may receive groundspeed data via line 108. This groundspeed data may be gathered from either the drive speed of traction drive system 38 or a sensor (not shown) operably coupled to either lawn roller 36 or rollers 26. Additionally, mower controller 58 receives motor speed data from motor 32 at line 110, current draw (if applicable) data from motor 32 at line 112, speed data from reel 18 at line 114, and overall system voltage at line 116. This data may then be used to vary the operation of greens mower 10, such as by disengaging motor 28 upon detection of a current spike caused by a jam or during overload or overheating.

Mower controller 58 includes additional features that are useful for the accurate and reliable control of greens mower 10. Specifically, mower controller 58 and/or data display 56 are preferably capable of wireless or datalinked communication with a master controller 102. Master controller 102 preferably includes all of the control features of data display 56 and further includes additional administrator/supervisor controls. It is anticipated that a single master controller 102 may be used to program or control a plurality of greens mowers simultaneously to facilitate the rapid configuration of multiple greens mowers. However, it should be understood that these same administrator/supervisor control settings may be accessed via data display 56.

Administrator/supervisor control settings may include such features as a pre-set reel speeds, clip rates, and/or groundspeeds. Administrator/supervisor control settings are ideally not accessible by individual grounds workers. In the regard, mower controller 58 can then maintain a preselected clip rate set by an administrator or supervisor irrespective of the workers ground speed. It is preferable that additional indicators or visual/audible alerts are used to alert the worker when a supervisor setting can not be achieved. Mower controller 58 further limits the operation of greens mower 10 at a point prior to this stage when a supervisor setting is not achieved.

Finally, mower controller 58 is preferably provided with a non-volatile memory and powered by greens mower 10 and/or separate power source.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling a greens mower, the greens mower having a motor drive system variably driving a grass cutting reel and a traction system, the method comprising:
    sensing an operating parameter of the greens mower for controlling speed of the cutting rate of the greens mower;
    comparing the operating parameter to the greens mower to a predetermined parameter of the greens mower and outputting a control signal to the motor drive system in response thereto for controlling said motor drive system; and
    outputting a user signal to a visual display device including one of an LED or an LCD representative of the control signal to alert an operator of the operating parameter of the greens mower and as a user interface operable to permit the operator to control the greens mower.

2. The method according to claim 1, further comprising setting the predetermined parameter by an administrator remotely positioned from a cutting location such that the predetermined parameter is unchangeable by an operator of the greens mower at the cutting location.

3. The method according to claim 2 wherein the setting the predetermined parameter by an administrator includes setting the predetermined parameter via a controller releasable cable connection.

4. The method according to claim 1 wherein the sensing an operating parameter of the greens mower includes sensing an operating parameter chosen from the group consisting essentially of groundspeed data, motor speed data, current draw data, grass cutting reel speed data, and overall system voltage data.

5. The method according to claim 1 wherein the comparing the operating parameter to the predetermined parameter and outputting the control signal to the motor drive system in response thereto includes outputting a control signal to vary a grass cutting reel speed.

6. The method according to claim 1 wherein the comparing the operating parameter to the predetermined parameter and outputting the control signal to the motor drive system in response thereto includes outputting a control signal to vary a groundspeed.

7. The method according to claim 1, wherein the setting the predetermined parameter by an administrator includes wirelessly setting the predetermined parameter via a wireless master controller.

8. The method according to claim 1, further comprising configuring the visual display device for display using a plurality of multinational languages.

9. The method according to claim 8, further comprising configuring the visual display device for display using a plurality of multinational units of measure.

10. The method according to claim 8, further comprising wirelessly setting the predetermined parameter by an administrator remotely positioned from the greens mower.

11. The method according to claim 8, further comprising presetting the predetermined parameter to prevent an operator of the greens mower from changing the predetermined parameter.

12. A method of controlling a greens mower, the greens mower having a motor drive system variably driving a grass cutting reel and a traction system, the method comprising:
   sensing an operating parameter of the greens mower for controlling speed of the cutting rate of the greens mower;
   comparing the operating parameter of the greens mower to a predetermined parameter of the greens mower and outputting a control signal to the motor drive system in response thereto for controlling said motor drive system;
   automatically increasing or decreasing a clip rate of the grass cutting reel in response to the control signal; and
   outputting a user signal to a visual display device representative of the control signal to alert an operator of the operating parameter, the visual display device mounted to a handle of the greens mower for visibility by an operator of the greens mower.

13. A method of controlling a greens mower, the greens mower having a motor drive system variably driving a grass cutting reel and a traction system, the method comprising:
   wirelessly transmitting a predetermined parameter of the greens mower to a mower controller;
   sensing an operating parameter of the greens mower for controlling speed of the cutting rate of the greens mower;
   comparing the operating parameter of the greens mower to the predetermined parameter of the greens mower and outputting a control signal to the motor drive system in response thereto for controlling said motor drive system; and
   automatically increasing or decreasing a clip rate of the grass cutting reel in response to the control signal.

14. The method according to claim 13, further comprising rotating the grass cutting reel using an electric motor.

15. The method according to claim 14 further comprising disengaging the electric motor when a motor current spike is detected.

* * * * *